July 29, 1958  F. A. KROHM  2,845,032
PUMP FOR USE WITH A WINDSHIELD WASHER SYSTEM
Filed Jan. 28, 1954

INVENTOR.
FRED A. KROHM
BY
Charles S. Penfold
ATTORNEY

United States Patent Office 2,845,032
Patented July 29, 1958

2,845,032

PUMP FOR USE WITH A WINDSHIELD WASHER SYSTEM

Fred A. Krohm, Hobart, Ind., assignor to The Anderson Company, a corporation of Indiana Application January 28, 1954, Serial No. 406,838

4 Claims. (Cl. 103—148)

This invention relates to intermittent-type foot pumps wherein pressure of the foot of the operator is transmitted to fluid in a chamber of the pump to discharge that fluid.

An object of this invention is to provide a fluid foot pump offering a minimum of frictional resistance to foot pressure while thereby producing at the fluid outlet a maximum of force with relation to the foot pressure applied to operate the pump.

Another object of the invention is to provide a fluid foot pump having maximum uniformity of fluid discharge throughout the stroke of the plunger of the pump.

Another object of the invention is to provide a fluid foot pump which may readily discharge substantially its maximum load at each operation.

Another object of the invention is to provide a fluid foot pump having substantially its entire external surface and body consisting of relatively soft rubberlike material unlikely to scuff, discolor, or injure any type of footwear.

Foot pumps are employed at times to deliver a maximum measure of fluid in a minimum period of time, such as for facilitating the action of a windshield wiper in cleaning a windshield of an automobile in transit.

Frequently, when the car is being driven in traffic on sloppy pavements, heavy splashes of blinding road muck are thrown against the windshield suddenly, and must be removed quickly for the safety of the driver and his passengers, as well as for the safety of other traffic.

Devices intended to project, against the windshield, cleaning fluid to assist the wiper in effecting a quick clearance of such extraneous matter, often have such involved construction and means of activation that there is dangerous delay in projecting the water or other cleaning fluid against the windshield. Some such devices rely upon limited and varying vacuum of the intake of the automobile engine for power to propel the fluid, with mechanism which must be activated, for example, by pressing a button or plunger, usually somewhere on the instrument panel of the automobile. This may require that one hand be removed from the steering wheel (at an instant when the control of the car is critical) to perform two operations: one (in the event the wiper motor is not operating) being the turning on of the windshield wiper motor and the other being always necessary for the pressing of the button which activates the mechanism intended to supply the fluid to help the wiper do the cleaning. With some such devices the hand must be removed from the wheel repeatedly—as repeated charges of fluid are required to get the windshield clean. Such vacuum-operated devices expose the fuel mixture of the engine to undesirable imbalance and also expose the vacuum system to the danger of leaks.

Other types of windshield washers employ as pumps rubber bulbs so shaped as to produce comparatively high resistance to foot pressure, and, resultantly, only partial discharge of the feed load of the pump with a comparatively irregular pressure and discharge of fluid at the outlet to the windshield, with relation to the amount of foot pressure applied.

Some such foot pumps have hard and irregular exteriors to which the pressure of the foot is to be applied. Since the pump usually is positioned out of sight of the driver and necessarily somewhat remote from brake and/or clutch pedals, the driver is required not only to locate the pump with his foot but also to apply foot pressure at a predetermined angle which will give the quickest and most effective discharge of which the pump is capable. Striking the pump at irregular angles produces minimum results in the application of the cleaning fluid to the windshield and may delay those results critically in extreme emergencies.

Women wearing fragile shoes or slippers often have them damaged in the process of contacting the pump. The pump is used so infrequently that the prompt and correct involuntary application of the foot which occurs when operating brake and/or clutch pedals may be absent in the process of finding and operating the pump with the foot.

The subject invention minimizes or eliminates such and other undesirable operative features. The subject pump offers no harsh contacts to injure even the most delicate shoes. Substantially its entire exposed surface is of rubber or the like.

As exemplified in the drawings, the plunger, or piston, is of such cross-sectional dimensions as to provide substantial resistance to its distortion. The plunger is supported by a relatively thin annular hinge portion forming a part of the chamber wall and extending integrally from the plunger into the side wall of the chamber.

It will be noted that the side wall progressively increases in thickness toward the base of the chamber so as to provide a conforming contact with the inner portion of the plunger as the plunger seats itself at the bottom of the chamber.

Such gradual increase in the thickness of the side wall also prevents undesirable expansion of the side wall under pressure of the fluid content of the chamber, and the mutual contact conformity of plunger and side wall permits the plunger to so fully seat itself as to cause substantially full discharge of fluid content of the chamber.

In ordinary operation the annular hinge portion yields readily to permit the plunger and hinge portion to telescope within the side wall as the plunger progresses downward to seat itself. Such telescoping occurs with substantially maximum effect even though the angle of approach and pressure of the foot is somewhat divergent from the ideal. The effect of this novel feature is to deliver a maximum of fluid to the windshield with a minimum of delay and effort.

The novel construction of this foot pump, with its extremely flexible hinge portion, makes the pump relatively sensitive to operative pressures of the foot and permits a prompt and complete refilling upon the release of the foot pressure—preparatory to another discharge.

The preferred embodiment of the invention is clearly exemplified in the drawings wherein.

Figure 1:
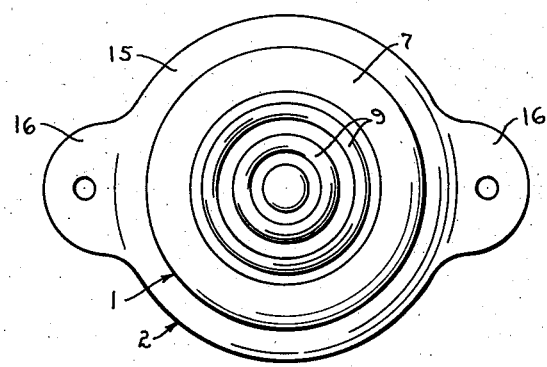
Figure 1 is a top view of the pump with a mounting associated therewith.

Referring more particularly to the drawings, numeral 1 generally designates a pump and 2 a mounting therefor.

The pump may be constructed in various ways but as herein illustrated is preferably a one-piece structure. More specifically, the pump is made in the form of a generally cylindrical resilient casing or housing having a chamber 3 therein and includes a base portion 4, and a tapered side wall 5 joined to a plunger or piston portion 6 by an annular hinge portion 7. The outer surface of the casing is cylindrical and the inner surface of the side wall is curved or sloping as indicated at 8 to more or less define a concave formation or seat constituting the lower part of the chamber for the liquid. The annular hinge portion 10 is of a smaller cross-sectional dimension than any other part of the side wall or the plunger and as a consequence the hinge may freely flex when the plunger is operated.

Figure 2:
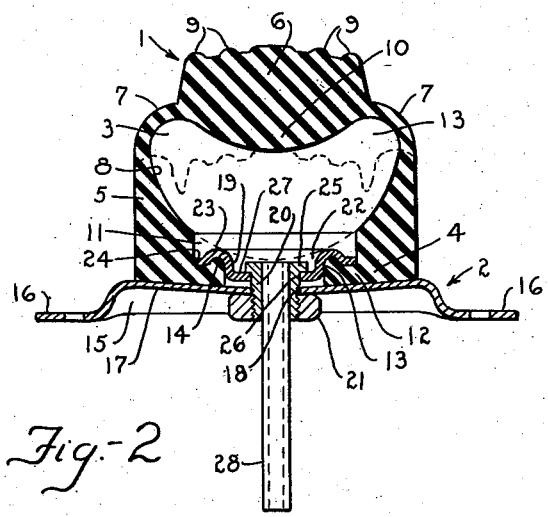
Figure 2 is a vertical section taken through the pump, mounting and the means employed for detachably connecting the pump to the mounting.
Figure 3:
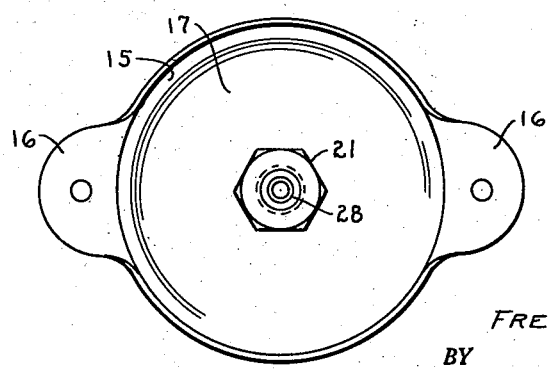
Figure 3 is a bottom view of the structure exemplified in Figure 2.

The plunger 6 is round and disposed in concentric relation with respect to the wall 5. It is made quite thick and its outer portion is provided with suitable corrugations 9 to assist in preventing slippage of the foot when it is applied to the plunger. The plunger is also preferably provided with an inner convex re-entrant portion 10. The curvature of the convex portion is formed to more or less correspond to the curvature of the inner surface 8 of the side wall so that when the plunger is depressed to place the plunger in a substantially fully nested or telescoped relationship with the side wall as illustrated by the dotted lines in Figure 2, practically all of the liquid within the chamber will be expelled therefrom. In other words, the plunger can be moved inwardly so that its convex portion will engage the seat 8 and thereby substantially fill the chamber to substantially evacuate all liquid therefrom.

Attention is directed to the fact that the cross-sectional diameter of the chamber 3 is greater than its axial dimension as well as the cross-sectional diameter of the plunger 6. Also, that the chamber is more or less kidney shaped in cross-dimension due to the character of the re-entrant portion 10. It will be further noted that the casing is so formed that its annular side wall serves to impart sufficient stability to the casing so that the side wall will not be unduly distorted out of shape when the plunger is operated.

The normally flat base portion 4 and side wall of the casing are formed to provide an internal circular recess 11 which constitutes a continuation of the chamber 3. The base portion 4 includes a portion 12 constituting the bottom wall of the recess 11. The bottom wall 12 is provided with an axially extending outlet opening 13 and an upwardly extending annular bead 14 adjacent the opening.

The mounting 2 may be constructed in various ways but as herein illustrated includes a generally inverted round cup portion 15 provided with ears 16 having apertures therein through which means may be extended for attaching the mounting to a suport such as the floorboard of an automotive vehicle. The upper wall 17 of the cup 15 is preferably slightly dished or made concave and provided with a centrally disposed hole 18.

The pump above described may be detachably connected to the mounting in any manner desired, but as herein shown it is preferably attached thereto by a plurality of elements including a plate member 19, a tubular clamping member or element 20, and a nut 21. More specifically in this respect, the plate 19 is disposed in the circular recess 11 and is provided with a recessed portion 22 which fits in the opening 13 of the bottom wall 12. This plate is also provided with a cove portion 23 which receives the bead 14 and a radial flange 24 which bears against the upper surface of the bottom wall 12 of the recess 11 provided in the casing. The recess 11 also serves to receive a portion of the convex portion 10 when the plunger is fully depressed to expel any liquid in the recess and at the same time affords relief for the convex portion so that it will engage the seat 8. The plunger, as viewed in Figure 2, may be caused to engage the plate 19 and/or the tubular member 20 to block the flow of any fluid through the member 20 and tube attached thereto when substantially all of the fluid is evacuated from the chamber. Attention is directed to the fact that the bead and cove assist in holding the pump in proper relationship to the mounting by preventing the bottom wall 12 from being pushed out from between the mounting and plate.

The clamping element 20 is provided with an enlargement 25 which is located within the recessed portion 22 of the plate 19 and bears intimately against its upper surface. The clamping element also includes a portion which is pressed fitted in a hole 26 provided in the plate 19 and extends through the opening 18 provided in the mounting 2 and such portion is externally threaded so that the nut 21 can be threadedly attached thereto in a manner whereby the plate 19 and mounting can be drawn tightly toward one another by manipulating the nut. It will be noted that sufficient clearance is provided between the bottom wall 27 of the plate and the upper wall 17 of the mounting so that the bottom wall 12 will be firmly pressed against the upper surface of the mounting and provide a leak-proof seal between the base portion of the casing and the mounting, a seal between the plate 19 and the bottom wall 12 of the casing and a seal between the clamping element 20 and the plate so that a liquid will only circulate in the chamber and through a tube 28, the latter of which is suitably secured in the clamping element as shown. The interfitting relationship between the cove 23 on the plate and the bead 14 on the casing serve to firmly anchor the casing to the mounting.

As mentioned above, the upper wall 17 of the mounting is preferably made concave. The purpose of shaping the wall in this manner is to compensate for any buckling or lifting of the base portion 4 of the casing adjacent its periphery away from the mounting resulting from the clamping or compressing of the bottom wall 12 of the casing. In other words, the normally flat base portion of the casing will be caused to conform to the upper wall when the casing is properly secured to the mounting and thereby eliminates what might otherwise be a gap appearing between the casing and mounting.

Having thus described my invention, it is obvious that various modifications may be made in the same without departing from the object of the invention, and, therefore, I do not wish to be understood as limiting myself to the exact form, construction, arrangement and combination of parts herein shown and described.

I claim:

1. A pump of the kind described comprising a one-piece resilient cylindrical body having a chamber, said body including a base portion provided with an opening communicating with the chamber and a side wall having an outer cylindrical surface and an inner surface, said body also including a plunger having an inner surface substantially conforming to the inner surface on the side wall and an annular hinge portion joining the side wall and plunger in a manner whereby the plunger may be telescoped into the chamber to engage the inner surface of the side wall and thereby substantially fully occupy the chamber to substantially completely evacuate any fluid therein, the arrangement being such that the inner surface of the side wall, the inner surface of the plunger and the inner surface of the hinge portion define the chamber.

2. A pump assembly of the kind described comprising a one-piece resilient body provided with a chamber, said body including a base wall provided with an opening and an annular side wall, said body also being formed to provide an inner concave formation defining the lower part of the chamber, said body also including a plunger disposed opposite the opening and having an inner convex portion substantially conforming to the curvature of the concave formation and an annular hinge portion joining the side wall and plunger, said plunger being relatively thick in an axial direction and being of a smaller cross-sectional diameter than the cross-sectional diameter of the chamber so that the plunger may be telescoped into the chamber to place the convex portion of the plunger against the concave formation to substantially completely evacuate the chamber to force fluid through said opening.

3. The assembly defined in claim 2 in which the size and relationship of the plunger to the opening are such that the plunger can be telescoped to block the flow of fluid through the opening when the fluid in the chamber is substantially completely evacuated.

4. A pump assembly of the kind described comprising a one-piece resilient body provided with a chamber and a recess, said body also including a base wall provided with an opening, an annular side wall forming an inner smooth uninterrupted concave formation defining the lower part of the chamber, a plunger disposed axially opposite the opening and recess and having an inner smooth uninterrupted convex portion substantially conforming to the curvature of the concave formation, an annular hinge portion joining the side wall and plunger, said plunger being relatively thick in an axial direction and being of a smaller cross-sectional diameter than the cross-sectional diameter of the chamber so that the plunger can be telescoped into the chamber to place the convex portion of the plunger against the concave formation to substantially completely evacuate the chamber, a mounting constituting a part of the pump assembly supporting the body and provided with means to facilitate attachment of the assembly to a support, an aperture provided in the mounting opposite the opening in the base wall of the body, a plate member disposed in the recess of the body and provided with a tubular clamping member communicating with the chamber for the passage of fluid and extending through the aperture in the mounting, means connected to the clamping member for detachably securing the body and mounting in assembled relationship, and said plunger also being telescopable within said annular side wall so that a portion of the plunger may be moved into the recess to engage at least one of said members to prevent flow of fluid through the tubular clamping member when the chamber is substantially completely evacuated.

References Cited in the file of this patent

UNITED STATES PATENTS

| | | |
|---|---|---|
| 1,568,091 | Schatz | Jan. 5, 1926 |
| 2,476,545 | Hayward | July 19, 1949 |
| 2,717,556 | Bartoo | Sept. 13, 1955 |

FOREIGN PATENTS

| | | |
|---|---|---|
| 628,648 | Germany | Apr. 8, 1936 |